US011351427B1

(12) United States Patent
Martens et al.

(10) Patent No.: US 11,351,427 B1
(45) Date of Patent: Jun. 7, 2022

(54) HOLLOW CO-MOLDED IRON WITH INNER LIGHTWEIGHT PORTION

(71) Applicant: Acushnet Company, Fairhaven, MA (US)

(72) Inventors: Grant M. Martens, San Diego, CA (US); Uday V. Deshmukh, Carlsbad, CA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 17/200,116

(22) Filed: Mar. 12, 2021

(51) Int. Cl.
*A63B 53/04* (2015.01)
*B29C 70/34* (2006.01)
*B29C 43/10* (2006.01)

(52) U.S. Cl.
CPC ........ *A63B 53/047* (2013.01); *A63B 53/0433* (2020.08); *A63B 53/0462* (2020.08); *A63B 2053/0479* (2013.01); *B29C 43/10* (2013.01); *B29C 70/34* (2013.01); *B29C 70/342* (2013.01)

(58) Field of Classification Search
CPC .............. A63B 53/047; A63B 53/0475; A63B 53/0462; A63B 53/0433; A63B 2053/0479; B29C 70/34; B29C 70/342; B29C 43/10
USPC .................................. 473/324–350, 287–292
See application file for complete search history.

(56) References Cited

U.S. PATENT DOCUMENTS

| 1,894,706 | A | | 1/1933 | Reach | |
|---|---|---|---|---|---|
| 3,845,960 | A | * | 11/1974 | Thompson | A63B 60/00 473/336 |
| 3,979,122 | A | | 9/1976 | Belmont | |
| 4,523,759 | A | * | 6/1985 | Igarashi | A63B 60/42 473/346 |
| 4,664,383 | A | | 5/1987 | Aizawa | |
| 4,792,139 | A | | 12/1988 | Nagasaki et al. | |
| 4,798,383 | A | | 1/1989 | Nagasaki et al. | |
| 4,826,172 | A | | 5/1989 | Antonious | |
| 4,883,275 | A | | 11/1989 | Boone | |
| 4,884,812 | A | | 12/1989 | Nagasaki et al. | |
| 4,964,640 | A | | 10/1990 | Nakanishi et al. | |
| 5,184,823 | A | | 2/1993 | Desboilles et al. | |
| 5,328,175 | A | | 7/1994 | Yamada | |
| 5,348,302 | A | * | 9/1994 | Sasamoto | A63B 53/04 473/346 |
| 5,421,577 | A | | 6/1995 | Kobayashi | |
| 5,429,358 | A | | 7/1995 | Rigal et al. | |
| 5,439,223 | A | | 8/1995 | Kobayashi | |
| 5,766,092 | A | * | 6/1998 | Mimeur | A63B 60/00 473/329 |
| 5,904,628 | A | | 5/1999 | MacKay, Jr. et al. | |
| 5,985,197 | A | | 11/1999 | Nelson et al. | |
| 6,248,025 | B1 | | 6/2001 | Murphy et al. | |
| 6,319,150 | B1 | | 11/2001 | Werner et al. | |
| 6,398,666 | B1 | | 6/2002 | Evans et al. | |

(Continued)

*Primary Examiner* — Sebastiano Passaniti
(74) *Attorney, Agent, or Firm* — Randy K. Chang

(57) ABSTRACT

A multi-material iron type golf club head is disclosed. More specifically, the golf club head may have a first metallic portion, a second metallic portion, and a lightweight portion. The first metallic portion and the second metallic portion collectively define all external surfaces of the golf club head. The lightweight portion may be located within an interior cavity of the golf club head and may contact and support the striking face, the topline portion, the rear wall portion, and the sole portion of the golf club head.

20 Claims, 9 Drawing Sheets

(56) References Cited

U.S. PATENT DOCUMENTS

| | | |
|---|---|---|
| 6,440,009 B1 | 8/2002 | Guibaud |
| 6,482,107 B1 | 11/2002 | Urbanski |
| 6,592,469 B2 | 7/2003 | Gilbert |
| 6,616,546 B2 | 9/2003 | Cho |
| 6,743,117 B2 | 6/2004 | Gilbert |
| 7,281,991 B2 | 10/2007 | Gilbert |
| 7,399,238 B2 | 7/2008 | Hocknell |
| 7,749,100 B2 * | 7/2010 | Tavares ............... A63B 60/02 473/332 |
| 8,206,237 B2 * | 6/2012 | Gilbert ............... A63B 60/02 473/309 |
| 8,241,141 B2 * | 8/2012 | Takechi ............ A63B 53/0466 473/329 |
| 8,348,786 B2 * | 1/2013 | Nakano ............. A63B 53/047 473/342 |
| 10,052,534 B1 * | 8/2018 | Ines ..................... A63B 60/02 |
| 10,307,649 B1 * | 6/2019 | Martens ........... A63B 53/0475 |
| 10,463,933 B2 * | 11/2019 | Mata ................ A63B 53/0475 |
| 10,953,293 B2 * | 3/2021 | Demkowski ......... A63B 60/00 |
| 2001/0055996 A1 | 12/2001 | Iwata et al. |
| 2003/0083151 A1 | 5/2003 | Nakahara et al. |
| 2003/0148818 A1 | 8/2003 | Myrhum |
| 2004/0023730 A1 | 2/2004 | Nagai |
| 2005/0009626 A1 | 1/2005 | Imamoto et al. |
| 2005/0124437 A1 | 6/2005 | Imamoto |
| 2005/0277484 A1 * | 12/2005 | Reed ................. A63B 53/047 473/332 |
| 2011/0028236 A1 * | 2/2011 | Takechi .............. A63B 53/047 473/332 |
| 2012/0071270 A1 * | 3/2012 | Nakano .............. A63B 53/047 473/350 |
| 2016/0287955 A1 * | 10/2016 | Ritchie ................. C22C 27/04 |
| 2016/0296808 A1 * | 10/2016 | Harrington ......... A63B 53/047 |
| 2019/0168087 A1 * | 6/2019 | Martens ........... A63B 53/0475 |
| 2019/0262673 A1 * | 8/2019 | Clarke ............. A63B 53/0475 |

* cited by examiner

HOLLOW CO-MOLDED IRON WITH INNER LIGHTWEIGHT PORTION

FIELD OF THE INVENTION

The present invention relates generally to a multi-material iron golf club head. More specifically, the present invention relates to a multi-material iron golf club head wherein the entirety of the external structure of the iron golf club head is made out of metallic materials while the internal surfaces along the striking face, topline portion, rear wall portion, and sole are made out of a lightweight material that serves to reduce the amount of mass associated with the metallic materials and provides structural support to the striking face, reducing stress, and improving the feel of the golf club head.

BACKGROUND OF THE INVENTION

In order to keep up with the increasing demands of the golfing public for more technology and performance from their iron type golf club heads, golf club designers have been forced to change the design of iron type golf club heads away from traditional muscle back construction in order to keep up with this trend.

One of the earliest attempts to improve the performance of the iron was to improve the moment of inertia of a golf club head by adding weight to the perimeter of the golf club head to create more forgiveness in off-center shots. U.S. Pat. No. 4,826,172 to Antonious provides an illustration of this technology by showing a perimeter weighted iron-type golf club head with a recessed or cavity back and a peripheral mass having an improved weight configuration.

Another way to improve the forgiveness of an iron type golf club head in addition to removing weight from the central portion and moving it out on the perimeter as illustrated above is to use exotic materials that are heavier than steel. The utilization of exotic materials that are heavier than steel allows more discretionary weight to be created in the same footprint, further improving the performance of an iron type golf club head. U.S. Pat. No. 3,845,960 to Thompson illustrates this principle by placing tungsten powder at the heel and toe end of the golf club head to improve the moment of inertia of the golf club head.

With the development of more advanced materials, the infatuation with lightweight materials such as carbon fiber composite has also worked its way into golf club design, creating yet another way to improve upon the forgiveness of an iron type golf club head. U.S. Pat. No. 4,664,383 to Aizawa provides an early example of this by creating a golf club with resin with woven material as well as resin with non-oriented fibers to create a golf club head.

In addition to making the golf club more forgiving as shown by the three above examples, another way to improve the performance of an iron type golf club head is to improve the ballspeed of the iron type golf club head. One way to achieve this is to decrease the thickness of the striking face of the golf club head. U.S. Pat. No. 6,592,469 to Gilbert provides an example of this technology by teaching a golf club with a thin front face for striking a golf ball and a peripheral weighting surrounding the back of the front face and defining a cavity.

Despite all the attempts to improve the performance of an iron type golf club, none of the designs have been able to combine all of the best characteristics of each individual technology in one compact convenient package. More specifically, none of the designs incorporate advanced material technology to increase the forgiveness and ballspeed of the iron type golf club head in one unitary golf club chassis without sacrificing the aesthetic appeal of the golf club.

BRIEF SUMMARY OF THE INVENTION

One aspect of the present invention is a hollow-bodied iron golf club head that includes a first metallic portion further comprises a hosel, a heel portion, a topline portion, a sole portion opposite said topline portion, a striking face portion, and a rear wall portion opposite said striking face. Said sole portion, said striking face portion, said topline portion, and said rear wall portion collectively define a first opening near a toe side of said first metallic portion. A lightweight portion further comprises a topline support, a sole support, an internal face support, and an internal rear wall support. Said topline support, said sole support, said internal face support, and said internal rear wall support collectively define a second opening near a toe side of said lightweight portion. Said lightweight portion engages said first opening near said toe side of said first metallic portion. Said first metallic portion conceals said topline support, said sole support, said internal face support, and said internal rear wall support. A second metallic portion is adapted to close said first opening and define a toe portion of said hollow-bodied iron golf club head.

According to another aspect of the present invention, a hollow-bodied iron golf club head comprises a first metallic portion further comprising a hosel, a heel portion, a topline portion, a sole portion, a rear wall portion, and a striking face portion. Said sole portion, said striking face portion, said topline portion, and said rear wall portion collectively define a first opening near a toe side of said first metallic portion. A lightweight portion further comprises an internal topline support, an internal sole support, an internal face support, and an internal rear wall support. Said topline support, said sole support, said internal face support, and said internal rear wall support collectively define a second opening near a toe side of said lightweight portion. Said lightweight portion engages said first opening near said toe side of said first metallic portion. A second metallic portion adapted to close said first opening and define a toe portion of said hollow-bodied iron golf club head. A heel weight located at a bottom heel portion of said first metallic portion. A toe weight located at a bottom toe portion of said second metallic portion.

According to another aspect of the present invention, a method of manufacturing a hollow bodied iron golf club head, comprises providing a first metallic portion further comprising a hosel, a heel portion, a topline portion, a sole portion, a rear wall portion, and a striking face portion. Said sole portion, said striking face portion, said topline portion, and said rear wall portion collectively define a first opening near a toe side of said first metallic portion. The method further comprises securing a heel weight within said heel portion of said first metallic portion; providing an uncured composite element through said first opening; curing said uncured composite element for a predetermined time and a predetermined temperature so as to define a lightweight portion further comprising an internal topline support, an internal sole support, an internal face support, and an internal rear wall support, wherein said topline support, said sole support, said internal face support, and said internal rear wall support collectively define a second opening near a toe side of said lightweight portion, providing a second metallic portion that defines a toe portion of said hollow-bodied iron golf club head; securing a toe weight within said toe portion of said second metallic portion; and joining said second metallic portion to said first metallic portion.

These and other features, aspects and advantages of the present invention will become better understood with reference to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

The following detailed description describes the best currently contemplated modes of carrying out the invention. The description is not to be taken in a limiting sense, but is made merely for the purpose of illustrating the general principles of the invention, since the scope of the invention is best defined by the appended claims.

Various inventive features are described below and each can be used independently of one another or in combination with other features. However, any single inventive feature may not address any or all of the problems discussed above or may only address one of the problems discussed above. Further, one or more of the problems discussed above may not be fully addressed by any of the features described below.

Figure 1:
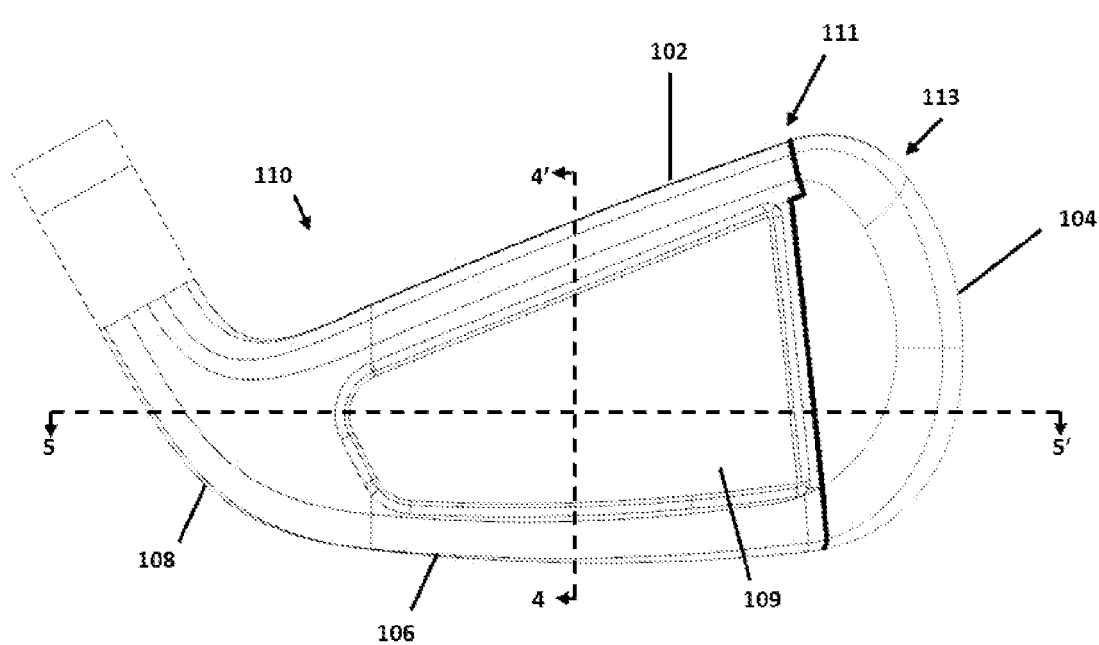
FIG. 1 shows a rear view of a golf club head in accordance with an exemplary embodiment of the present invention.

FIG. 1 of the accompanying drawings shows a rear view of a golf club head 100 in accordance with an exemplary embodiment of the present invention. More specifically, the golf club head 100 shown here may have a topline portion 102, a toe portion 104, a sole portion 106, a rear wall portion 109, and a heel portion 108. The golf club head 100 shown here may be separated into a first metallic portion 110 and second metallic portion 113 that are separated by a separation line 111. The separation line 111 is shown in darker and heavier lines for emphasis, but should be more visible in subsequent views of the invention wherein the different components are exploded to help illustrate the separation line 111. It is noted that the golf club head 100 is a hollow-bodied iron type golf club head.

Figure 2:
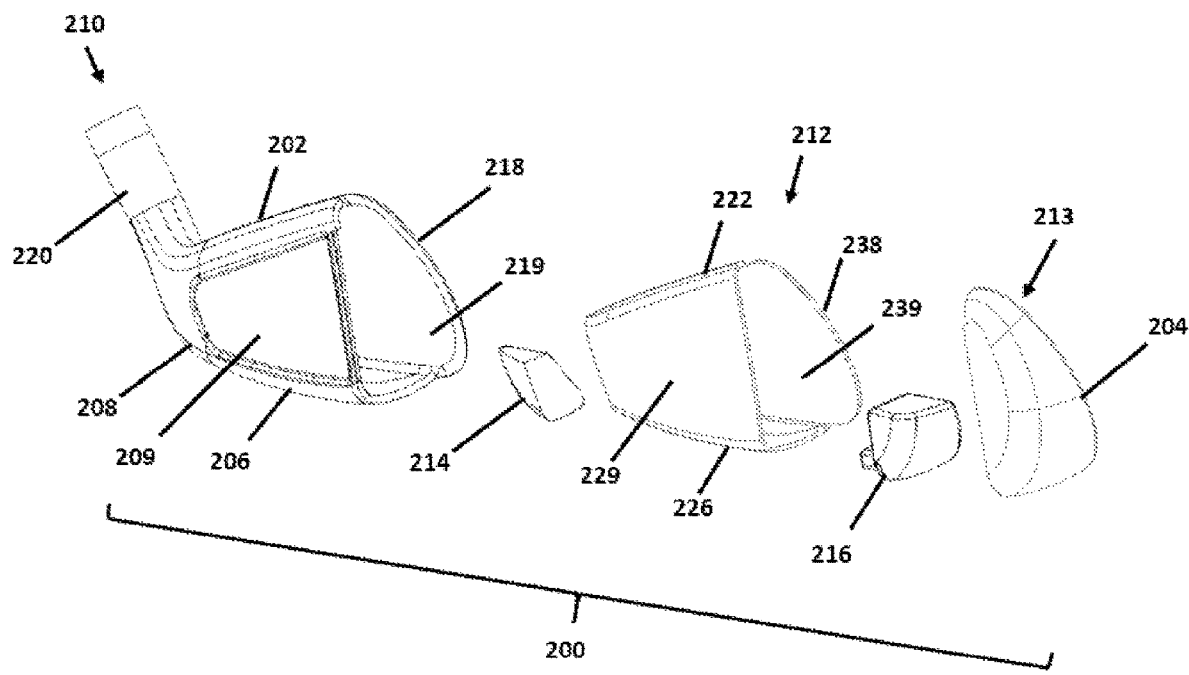
FIG. 2 shows an exploded rear perspective view of a golf club head in accordance with an exemplary embodiment of the present invention.

FIG. 2 of the accompanying drawings shows an exploded rear perspective view of a golf club head 200 in accordance with an exemplary embodiment of the present invention allowing the relationship between the various components of the golf club head 200 to be shown more clearly. More specifically, FIG. 2 of the accompanying drawings shows an exploded rear perspective view of the various components. First and foremost, it can be seen that golf club head 200 is comprised of five major components, a first metallic portion 210, a lightweight portion 212, a second metallic portion 213, a heel weight 214, and a toe weight 216.

The first metallic portion 210 may be further comprised of a striking face portion 218, the topline portion 202, the sole portion 206, the rear wall portion 209, and the heel portion 208 containing the hosel 220. As described in greater detail below, the first metallic portion 213 may be formed as a single continuous component, or alternatively, the striking face portion 218 may be formed separately and joined to the topline portion 202, the sole portion 206, and the rear wall portion 209 to define the first metallic portion 210. The topline portion 202, the sole portion 206, the rear wall portion 209, and the striking face portion 218 collectively define a first opening 219 in the first metallic portion 210 orientated towards the toe portion of the golf club head.

The lightweight portion 212 in accordance with the current exemplary embodiment of the present invention may be further comprised of an internal topline support 222, an internal rear wall support 229, an internal sole support 226, and an internal face support 238. Much like the first opening 219 defined in the first metallic portion 201, the internal topline support 222, the internal sole support 226, the internal rear wall support 229, and internal face support 238 collectively define a second opening 239 in the lightweight portion 212 orientated towards the toe portion of the golf club head 200.

The lightweight portion 212 engages the first opening 219 of the first metallic portion 210 such that the internal topline support 222 engages the topline portion 202, the internal sole support 226 engages the sole portion 206, the internal rear wall support 229 engages the rear wall portion 209, and the internal face support 238 engages the striking face portion 218. Finally, it can be said that the lightweight portion 212 engages the first metallic portion 210 by engaging the opening 219 created by the first metallic portion 210. When the lightweight portion 212 is engaged with the first metallic portion 210 the first opening 219 is aligned with the second opening 239 as described in greater detail below.

The lightweight portion 212 as shown here allows the first metallic portion 210 of the golf club head 200 to be made thinner wherever there is an overlap in material, increasing the discretionary weight available in the golf club head 200. The lightweight portion 212 achieves this by increasing the structural integrity of the golf club head 200 at those specific locations where there is an overlap in material. According to an embodiment of the present invention, there is an overlap between the lightweight portion 212 and the first metallic portion 210 wherever the lightweight portion 212 is present. In other words, there is an overlap between the lightweight portion 212 and the first metallic portion 210 for a full 360 degrees from the striking face portion 218, to the topline portion 202, to the rear wall portion 209, to the sole portion 206 along a majority of the heel to toe width of the first metallic portion 210.

A heel weight 214 in this embodiment of the present invention may generally be positioned inside a bottom portion of the heel portion 208 of the first metallic portion 210, while a toe weight 216 may generally be located inside a bottom portion of the toe portion 204 of the second metallic portion 213.

When compared to a baseline golf club head having similar dimensions, total mass, and durability, utilization of the lightweight portion 212 in this manner allows the golf club head 200 to not only utilize the heel weight 214 and the toe weight 216, but also to reallocate material from the striking face portion 218 to the topline portion 202, the sole portion 206, the heel portion 208, and the second metallic portion 213. In detail, the baseline golf club has a total mass of about 242.4 g, including a heel weight having a mass of about 23.2 g, a toe weight having a mass of about 73.4 g, and steel components of the chassis having a total mass of about 145.8 g. In the baseline golf club head, about 39.9% of the total mass is contributed by the heel weight and the toe weight. The golf club head 200 has a nearly identical total mass of about 240.0 g, but the mass of the individual components varies significantly. In the golf club head 200, the heel weight 214 has a mass of about 20.1 g, the toe weight 216 has a mass of about 67.4 g, the lightweight portion 212 has a mass of about 10.3 g, and the combined weight of the first metallic portion 210 and the second metallic portion 213 is about 144.2 g. In golf club head 200 about 36.5% of the total mass is contributed by the heel weight 214 and the toe weight 216.

Given the unique construction of the golf club head 200, it is possible to beneficially increase the moment of inertia of the golf club head 200 about a vertical axis passing through the center of gravity of the golf club head 200, while maintaining overall club head weight, and maintaining, if not decreasing, the percentage of total mass allocated to the heel weight 214 and the toe weight 216. The baseline golf club head has a moment of inertia about a vertical axis passing through the center of gravity of the golf club head of about 276 kg-mm$^2$. The golf club head 200 has a moment of inertia about a vertical axis passing through the center of gravity of the golf club head of about 300 kg-mm$^2$. Therefore, despite having the same or less mass constituted by weights in the heel and toe as compared to the baseline golf club, the golf club head 200 shows an increase in the moment of inertia about a vertical axis passing through the center of gravity of the golf club head of as much as 15 percent. Such an increase dramatically increases the stability of the golf club head when striking shots heelward or toeward of center. Therefore a golf club head in accordance with embodiments of the present invention affords substantial improvement over golf club heads that may appear visually similar owing to both the structural support and weight savings afforded by the lightweight portion 212. It is noted that the present invention is not limited in this regard, and the mass saved from reducing the thickness of the striking face portion 218 may also be utilized within the heel weight 214 and the toe weight 216.

Finally, the separation line 111 shown in FIG. 1 can be seen more clearly in this exploded view of the golf club head 200 as the delineation between the first metallic portion 210 and second metallic portion 213. It is noted that according to an embodiment of the present invention, the separation line 111 may be obscured when the golf club head 200 is fully assembled. For example, the first metallic portion 210 and the second metallic portion 213 may be welded together along the separation line 111, which may be subsequently polished and/or coated (e.g., chromed) to obscure the appearance of the separation line 111.

As shown in FIG. 2, the lightweight portion 212 is inserted into the first metallic portion 210 through the opening 219 from the toe side after the heel weight 214 is installed in the heel portion 208. The lightweight portion 212 is fitted within the first metallic portion 210, and the second metallic portion 213 is attached to the first metallic portion 210 after the toe weight 216 is installed in the second metallic portion 213. The second metallic portion 213 includes the toe portion 204, which takes on the external shape of a golf club head 200.

In the current exemplary embodiment, the first metallic portion 210 and the second metallic portion 213 may generally be made out of a steel material having higher strength properties. In one exemplary embodiment of the present invention, high strength steel such as 17-4PH, Custom 450, 15-5PH or any other high strength castable stainless steel alloy. However, numerous other types of high strength steel may be used without departing from the scope and content of the present invention so long as the material can meet the high strength properties required for the present invention.

It is also within the scope of the present invention for the striking face portion 218 to be formed separately from the remainder of the first metallic portion 210 and subsequently joined to the remainder of the first metallic portion 210. In this case, the striking face portion 218 may be formed via a casting process or a forging process. Therefore, in addition to the materials above, the striking face portion 218 may also be formed of high strength steel such as Custom 455, Custom 465, Custom 475, Touralloy 275 in the stainless variety and SUP10, 4340, 4140, K301, AerMet 100, AerMet 300, AerMet 340, Maraging steels C350, C300, C250, NiMark 300, or any other high strength forgeable steel.

The first metallic portion 210 and the second metallic portion 213 in accordance with an exemplary embodiment of the present invention may generally have a density of greater than about 7.0 g/cc, more preferably greater than about 7.3 g/cc, and most preferably greater than about 7.6 g/cc.

The present invention is not limited in this regard. According to alternative embodiments of the present invention, one or both of the first metallic portion 210 and the second metallic portion 213 may be formed of a metallic material having a density of between about 4.0 g/cc to about 7.0 g/cc, and more preferably between about 5.5 g/cc to about 6.5 g/cc.

According to yet another embodiment of the present invention, one or both of the first metallic portion 210 and the second metallic portion 213 may be formed of a metallic material having a density between about 7.5 g/cc to about 13 g/cc, preferably between about 8.5 g/cc to about 12.0 g/cc, and most preferably containing at least one of nickel or copper.

The lightweight portion 212 of the present invention may generally be made out of a lightweight material that offers lightweight characteristics as well as relative high strength. According to an exemplary embodiment of the present invention, the lightweight portion 212 may be formed of a composite material. The composite material may be a thermoset or thermoplastic material. Further, the composite may include chopped or continuous fibers being oriented unidirectionally or woven into a fabric. However, in alternative embodiments, the lightweight material could be created out of aluminum, plastic, rubber, or any other type of lightweight material without departing from the scope and content of the present invention. The lightweight portion 212 in accordance with an exemplary embodiment of the present invention may generally have a density less than about 3.0 g/cc, more preferably less than about 2.5 g/cc, and most preferably less than about 2.0 g/cc.

Finally, the heel weight 214 and the toe weight 216 shown in this embodiment may generally be made out of a high density material capable of increasing the moment of inertia of the golf club head based on their strategic placement. For example, the high density material used for the heel weight 214 and the toe weight 216 may include a tungsten material may include a tungsten material having a density greater than about 12.0 g/cc, preferably greater than about 14.0 g/cc, and more preferably greater than about 17.0 g/cc.

Figure 3:
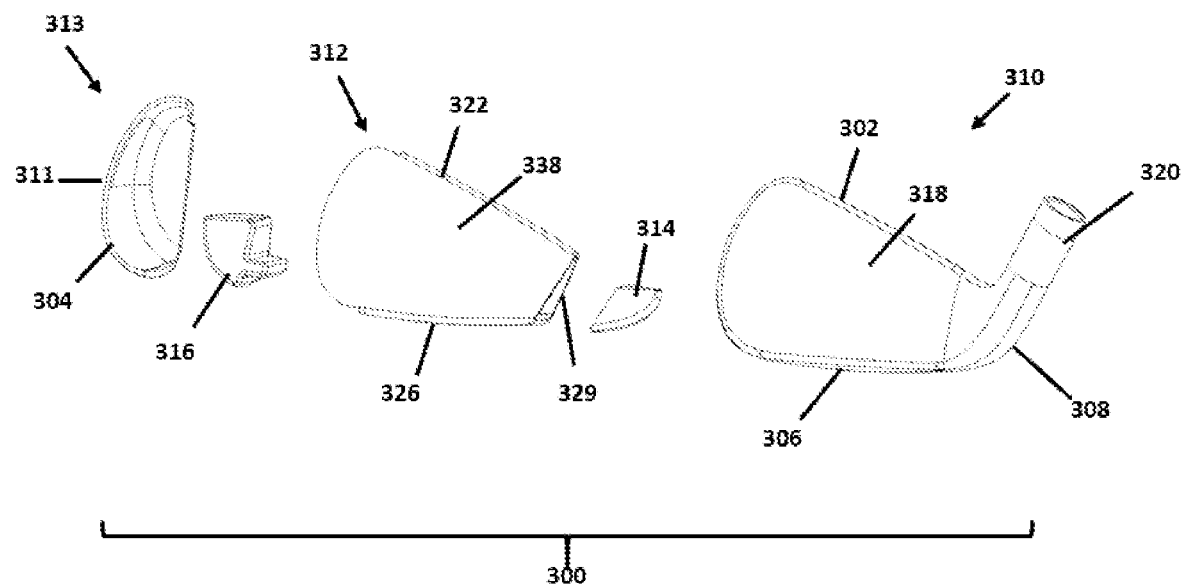
FIG. 3 shows an exploded frontal perspective view of a golf club head in accordance with an exemplary embodiment of the present invention.

In order to provide a more complete illustration of the relationship between the various components, FIG. 3 of the accompanying drawings shows an exploded front perspective view of a golf club head 300 in accordance with an alternative embodiment of the present invention. Golf club head 300, similar to golf club head 200 shown in FIG. 2, illustrates a first metallic portion 310 containing a hosel 320 and a striking face portion 318 that is adapted to contact a golf ball. The first metallic portion 310 also has a topline portion 302, a sole portion 306, a heel portion 308 in addition to the hosel 320 and the striking face portion 318. It should be noted that in this view, the first opening and the rear wall portion of the first metallic portion 310 are not visible, but are still configured in the same manner illustrated in FIG. 2. The heel weight 314, shown here to be exploded out from its position inside the bottom of the heel portion 308 may generally be attached via any attachment means desired without departing from the scope and content of the present invention. For example the heel weight 314 may be secured within the bottom of the heel portion 308 of the first metallic portion 310 by brazing, welding, adhesion, mechanical fastening, and the like. Preferably, the heel weight 314 is fastened to the first metallic portion 310 by welding or brazing.

The lightweight portion 312 in FIG. 3 shows the internal face support 338 that the previous discussion has referenced being placed at a front of the lightweight portion 312 directly behind the striking face portion 318 to provide structural support. In addition to the above, FIG. 3 of the accompanying drawings also shows the lightweight portion 312 with an internal topline support 322, an internal sole support 326, and an internal rear wall support 329. As detailed above, the lightweight portion 312 provides 360 degrees of support along a majority of the heel to toe width of the first metallic portion 310 from the striking face portion 318, to the topline portion 302, to the rear wall portion (not shown), to the sole portion 306.

Finally, FIG. 3 also shows the toe weight 316, shown here to be exploded out from its position inside the bottom of the second metallic portion 313, the toe weight 316 may generally be attached via any attachment means desired without departing from the scope and content of the present invention. For example the toe weight 316 may be secured within the bottom of the second metallic portion 313 by brazing, welding, adhesion, mechanical fastening, and the like. Preferably, the toe weight 316 is fastened to second metallic portion 310 by welding or brazing. From this perspective it is clear that the separation line 311 corresponds to the entire perimeter edge of the second metallic portion 313.

It is worthwhile here to mention that the lightweight portion 312 of the golf club head 300 in accordance with this exemplary embodiment is unique in its construction, geometry, and shape. To the untrained eye, the lightweight portion 312 may not possess any unique features because most golf clubs utilizes a metallic material to form the lightweight portion 312, and this geometry is easily achieved by casting a metallic part into this shape. However, as mentioned earlier, the lightweight portion 312 in accordance with this exemplary embodiment of the present invention is perfectly configured to sufficiently support the first metallic portion 310 having a reduced thickness while simultaneously enhancing the acoustics of the golf club head 300.

Taking a closer look at both the frontal and rear views shown in FIGS. 2 and 3, an interesting and unique feature of the present invention relating to the configuration of the lightweight portion 312 merits further discussion. In detail, it can be seen that the heelmost extent of each of the internal sole support 326, the internal rear wall support 329, the internal topline support 322, and the internal face support 338 terminate substantially along a single plane. However, the toemost extent of the internal face support 338 extends well beyond the toemost extent of each of the internal sole support 326, the internal rear wall support 329, and the internal topline support 322.

The lightweight portion 312 is structured in this manner for several reasons. First, when striking a golf ball, the toemost portion of the striking face portion 318 is less prone to deflection than the center of the striking face portion 318, because a perimeter of the toemost extent of the striking face portion 318 is directly supported by the second metallic portion 313. In contrast, the only direct support of the center of the striking face portion 318 is provided by the internal face support 338. To maximize the reinforcement and support of the striking face portion 318, the majority of the heel to toe width of lightweight portion 312 provides 360 degree support to the first metallic portion 310. However, the toemost extent of the lightweight portion 312 only includes the internal face support 338. While the toemost extent of the lightweight portion 312 provides some reinforcement and support of the striking face portion 318, it is most beneficial in ensuring that the acoustics of the striking face portion 318 are consistent and pleasing.

Furthermore, the weight saved by omitting the interior topline support 322, the interior rear wall support 329, and the interior sole support 326 from the toemost extent of the lightweight portion 312 may further increase the available discretionary weight that is distributed between the heel weight 314 and the toe weight 316.

Finally, it can be seen that the toemost extent of the lightweight portion 312 that defines the second opening 239 corresponds to the shape of the toemost extent of the first metallic portion 310 that defines the first opening 319 as well as the complementary shape of the second metallic portion 313. According to an exemplary embodiment of the present invention, the toemost extent of the lightweight portion 312 is recessed from the toemost extent of the first metallic portion 310 by less than 5 mm, and preferably between about 3 mm to about 4 mm. This dimension is critical to the present invention because it ensures maximum overlap between the striking face portion 318 and the internal face support 338, while maintaining sufficient room to weld the first metallic portion 310 to the second metallic portion 313 without harming the lightweight portion 312 in the process.

Figure 4:
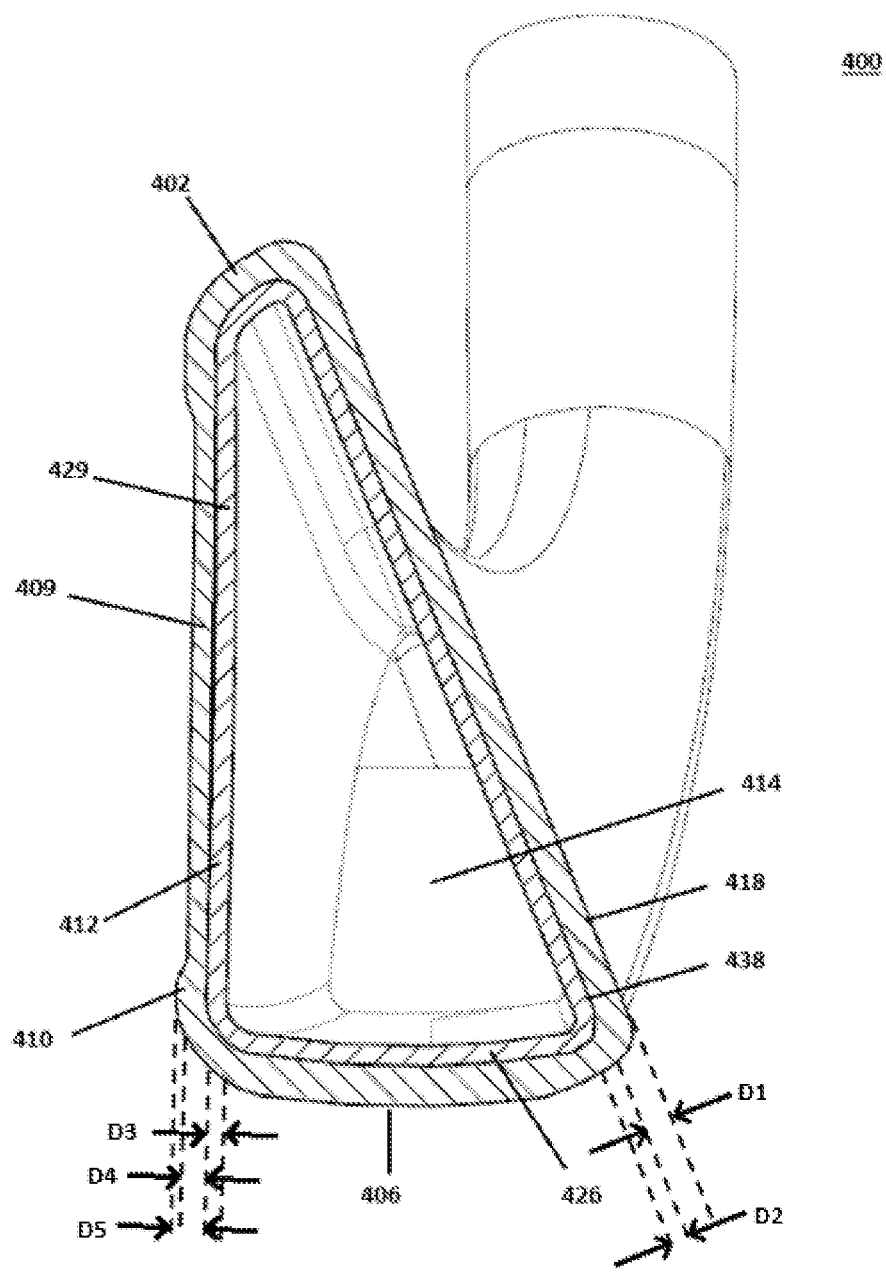
FIG. 4 shows a cross-sectional view of a golf club head in accordance with an exemplary embodiment of the present invention taken along cross-sectional line 4-4' shown in FIG. 1.
Figure 5:
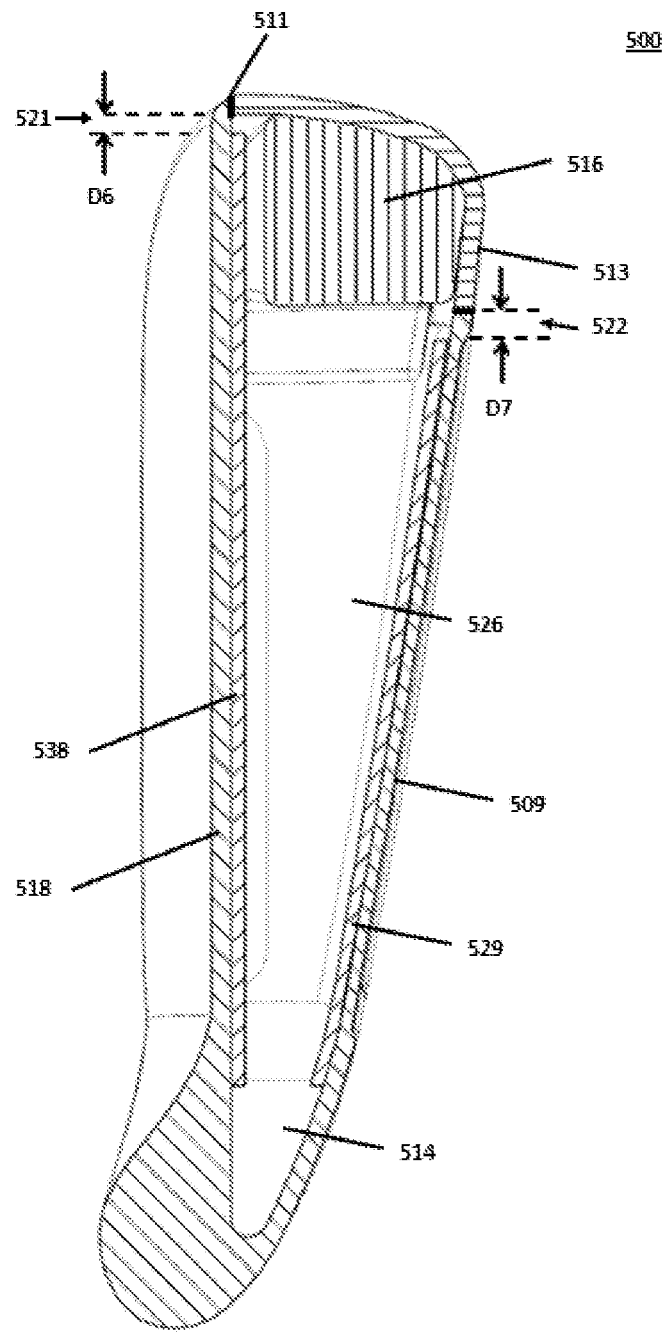
FIG. 5 shows a cross-sectional view of a golf club head in accordance with an exemplary embodiment of the present invention taken along cross-sectional line 5-5' shown in FIG. 1.

FIGS. 4 and 5 of the accompanying drawings show cross-sectional views of golf club heads 400 and 500, respectively taken along cross-sectional lines 4-4' and 5-5' shown in FIG. 1.

FIG. 4 shows a heel side cross-sectional view of a golf club head 400 in accordance with an alternative embodiment taken along cross-sectional line 4-4' to allow the relationship between the various components to be shown more clearly. This cross-sectional line 4-4' is taken along a vertical plane passing through the middle of the golf club head 400 to allow the relationship between the first metallic portion 410 and the lightweight portion 412 to be shown more clearly. More specifically, FIG. 4 of the accompanying drawings shows a first metallic portion 410 that extends continuously for 360 degrees from the striking face portion 418, to the topline portion 402, to the rear wall portion 409, to the sole portion 406. Similarly the lightweight portion 412 is shown here to be fitted within the first metallic portion 410 so as to contact and reinforce the first metallic portion 410 continuously for 360 degrees from the internal face support 438, to the internal topline support 422, to the internal rear wall support 429, to the internal sole support 426. While this cross-sectional view is taken at the center of the striking face portion 418, the relationships between the lightweight portion 412 and the first metallic portion 410 are the same across a majority of the width of the first metallic portion 410 in the heel to toe direction. As it can be seen here in FIG. 4, the heel weight 414 is positioned heelward of the lightweight portion 412.

FIG. 4 also illustrates the thicknesses of various components at the center of the striking face portion 218. Specifically FIG. 4 illustrates the thickness of the first metallic portion 410 at the striking face portion 418 and the rear wall portion 409 and the thickness of the lightweight portion 412 at the interior face support 438 and the interior rear wall support 429. The thickness of the first metallic portion 410 at the striking face portion 418 is represented by D1 in FIG. 4. The thickness of the first metallic portion 410 at the rear wall portion 409 is represented by D4 in a central portion of the rear wall portion 409 and represented by D5 around a perimeter of the rear wall portion 409. As detailed below, the thickness D4 is less than the thickness D5, which decreases the mass of the rear wall portion 409 and therefore increases the amount of discretionary weight. The thickness of the lightweight portion 412 at the interior face support 438 is represented by D2. The thickness of the lightweight portion 412 at the interior rear wall support 429 is represented by D3.

It can be seen that the thickness of the lightweight portion 412 is substantially constant around the entire 360 degrees while the thickness of the first metallic portion 410 is more varied.

Thickness D1 of the striking face portion 418 in accordance with the current exemplary embodiment may generally be between about 0.75 mm and about 1.8 mm, more preferably between about 1.0 mm and about 1.6 mm, and most preferably between about 1.3 mm and about 1.5 mm all without departing from the scope and content of the present invention. The thickness D2 of the internal face support 538, on the other hand, may have a thickness of between about 0.5 mm and about 2.0 mm, more preferably between about 0.75 mm and about 1.5 mm, and most preferably between about 1.0 mm and about 1.2 mm all without departing from the scope and content of the present invention. The perimeter portion of the rear wall portion 409 may have a thickness D5 of between about 1.0 mm and about 2.0 mm, more preferably between about 1.25 mm and 1.75 mm, and most preferably about 1.5 mm. The central portion of the rear wall portion 409 may generally have a thickness D4 that is reduced as compared to thickness D5. Thickness D4 may generally be between about 50% and 90% of the thickness D5, more preferably between about 60% and about 75% of the thickness D5, and most preferably about 66% of the thickness D5. The thickness D3 of the internal rear wall support 429 is about 0.5 mm and about 2.0 mm, more preferably between about 0.75 mm and about 1.5 mm, and most preferably between about 1.0 mm and about 1.2 mm.

The thickness D1 of the striking face portion 418 and the thicknesses D2 of the internal face support 438 are critical to the proper functionality of the current inventive golf club head 400. If the thickness of the striking face portion 418 is too thick, then the ballspeed performance of the golf club head 400 suffers and the weight of the striking face portion 218 is unnecessarily increased. This increase in weight reduces the potential for beneficial discretionary weight. On the other hand, if the thickness of the striking face portion 418 is too thin, then durability of the golf club head 400 suffers. However, the addition of the internal face support 438 allows for an increase in durability that can maintain the benefits of the reduced thickness of the striking face portion 418 while offsetting the negatives associated with a striking face portion 418 having a reduced thickness. Thus, the combination and the right balance of the various thicknesses is of the utmost importance to the present invention.

The relative thicknesses of the rear wall portion 409 and the interior rear wall support 429 are also critical to the proper functionality of the current inventive golf club head 400. If the thickness of the rear wall portion 409 is too thin, then durability of the golf club head 400 suffers. However, if the rear wall portion 409 is too thick, weight will be wasted and the potential mass available for beneficial discretionary weight will again be reduced. As with the striking face portion above, the internal rear wall support 429 increases the durability of the golf club head 400 while reducing the weight of the rear wall portion 409. It is critically important to strike the proper balance between the thickness of these layers to ensure that golf club head 400 remains durable while also maximizing available discretionary weight.

It is worth noting here that although the thickness of the striking face portion 418 is capable of getting so thin primarily because of the structural support provided by the lightweight portion 412, the lightweight portion 412 also improves the feel of the golf club head 400. As striking faces get thinner and thinner to improve performance attributes of golf club heads, specifically ballspeed and coefficient of restitution, the thinner metallic striking face portions can often feel too "clicky" and can sound hollow and "tinny." In the current exemplary embodiment, the lightweight portion 412, which is made out of a composite-type material, provides a more rigid and solid feel, and a more dense and solid sound, when compared to a golf club head having a similar metallic striking face without the inventive lightweight portion 412. Therefore, the lightweight portion 412 maximizes the benefits of a reduced thickness striking face portion 418 while mitigating the negatives associated with a reduced thickness striking face portion 418.

FIG. 5 of the accompanying drawings shows a top-down cross-sectional view of golf club head 500 in accordance with an alternative embodiment of the present invention taken along cross-sectional line 5-5' shown in FIG. 1. This cross-sectional line is taken along a horizontal plane passing through the middle of the golf club head 500 to allow the relationship between the first metallic portion 510, the lightweight portion 512, the second metallic portion 513, the heel weight 514, and the toe weight 516 to be shown more clearly. More specifically, FIG. 5 shows how the lightweight portion 512 is fitted within the first metallic portion 510. While the internal topline support is omitted due to the cross-sectional view, the interior face support 538, the internal sole support 526, and the internal rear wall support 529 are all clearly shown conforming to the interior cavity of the first metallic portion 510. As noted above, this cross-sectional view also more clearly shows how the internal face support 538 extends more toeward than the internal rear wall support 529 and how the separation line 511 (again shown in darker and heavier lines for emphasis) between the first metallic portion 510 and the second metallic portion 513 influences the configuration of the lightweight portion 512. In detail, a first gap 521 exists between the internal face support 538 and the second metallic portion 513. The first gap 521 spans between about 1.0 mm and about 5.0 mm, preferably between about 2.0 mm and about 4.0 mm, and most preferably between about 2.5 mm to about 3.5 mm. A second gap 522 exists between the second metallic portion 613 and each of the internal rear wall support 529, the internal sole support 526, and the internal topline support (not shown). The second gap 522 spans between about 1.0 mm and about 5.0 mm, preferably between about 2.0 mm and about 4.0 mm, and most preferably between about 2.5 mm to about 3.5 mm. While denoted as two separate gaps, it is noted that the it is also within the scope of the present invention for a single gap to separate the lightweight portion 512 from the second metallic portion 513 along the entirety of the separation line 511. As described above, the dimensions of the first gap 521 and the second gap 522 are critically important as they must strike a balance between reinforcing the golf club head 500 and ensuring sufficient room to weld the first metallic portion 510 to the second metallic portion 513 along the separation line 511. Finally, the positioning of the heel weight 514 within the first metallic portion 510 and the toe weight 516 within the second metallic portion 513 are more clearly shown in FIG. 5. While the heel weight 514 is surrounded by the first metallic portion 510, the internal face support 538 is interposed between the toe weight 516 and the striking face portion 518.

Figure 6:
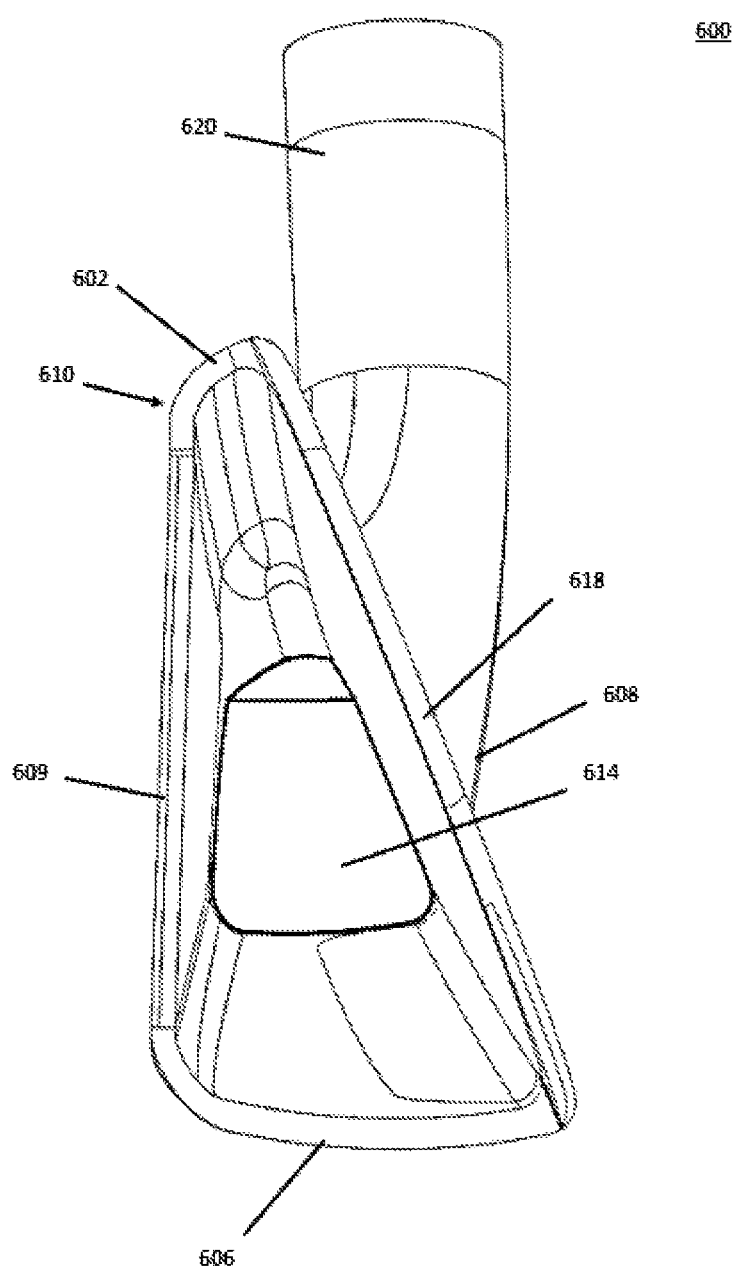
FIG. 6 shows a toe side view of a first metallic portion of a golf club head in accordance with an exemplary embodiment of the present invention.
Figure 7:
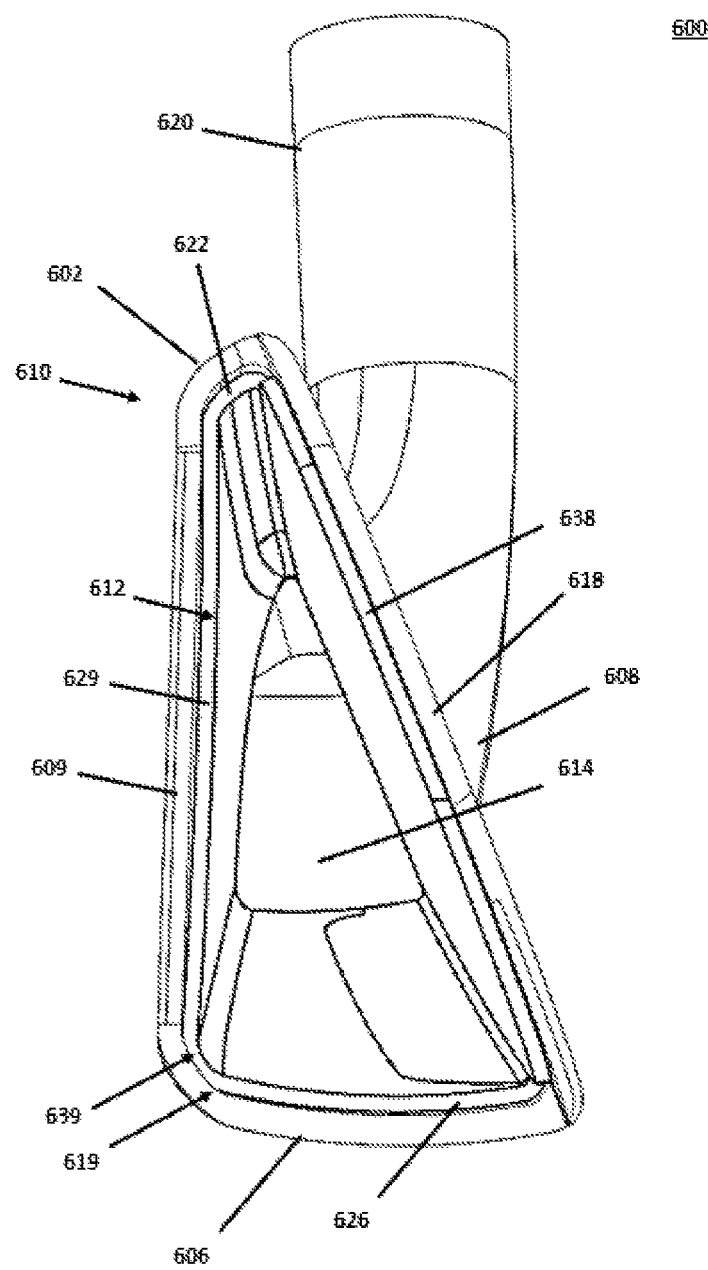
FIG. 7 shows a toe side view of a lightweight portion within a first metallic portion of a golf club head in accordance with an exemplary embodiment of the present invention.
Figure 8:
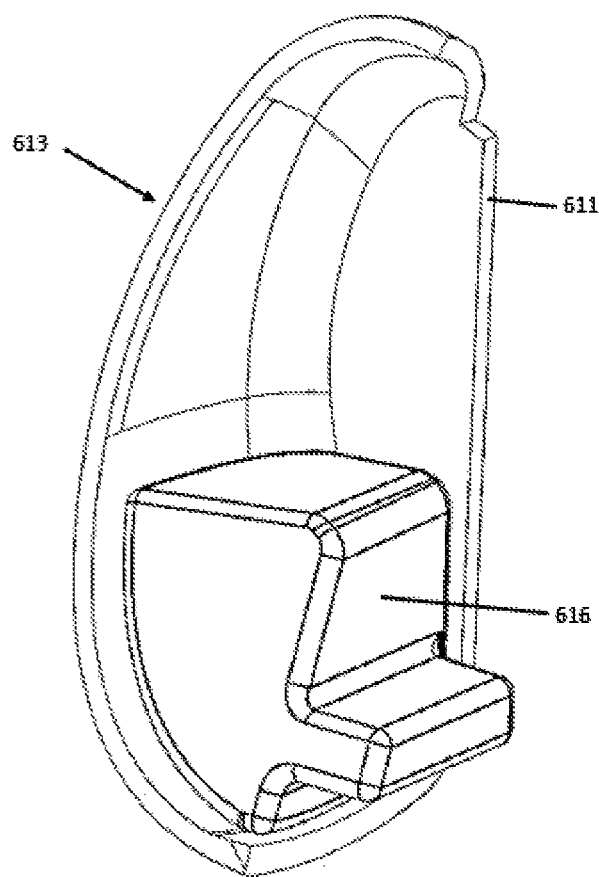
FIG. 8 shows front perspective view of a second metallic portion of a golf club head in accordance with an exemplary embodiment of the present invention.
Figure 9:
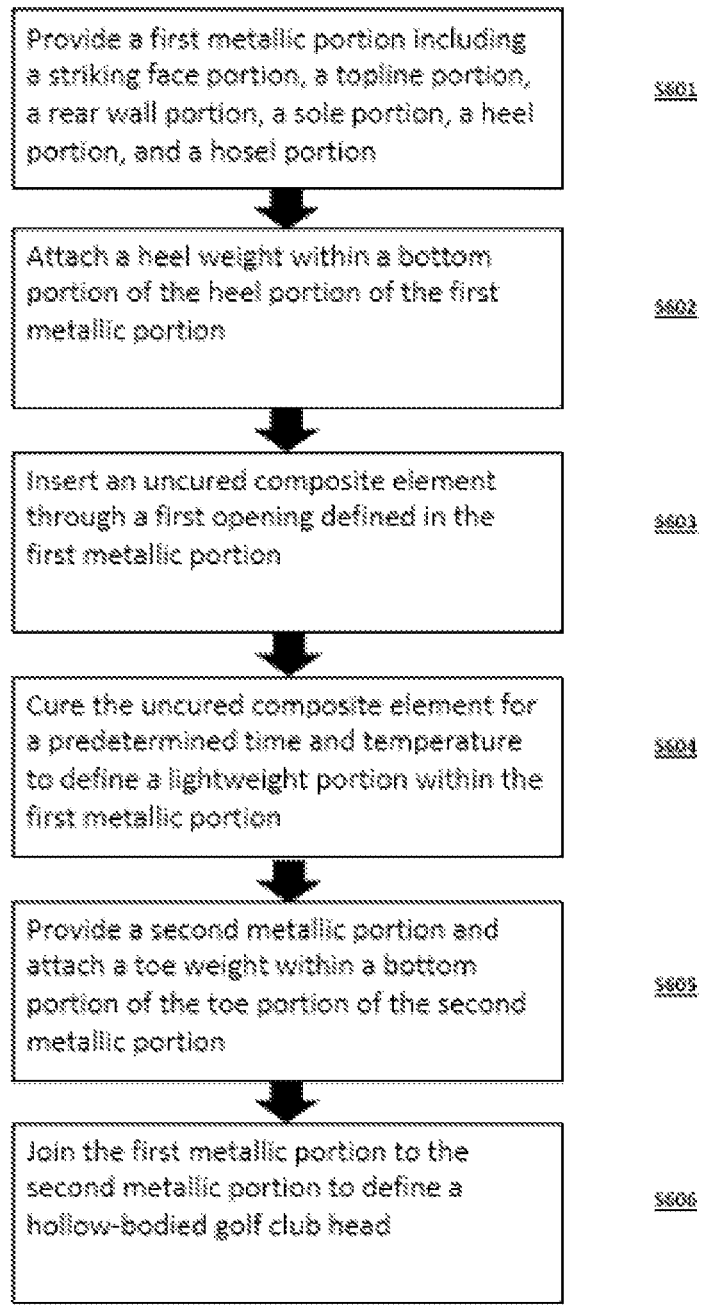
FIG. 9 shows a flowchart of a method of manufacturing a golf club head in accordance with an exemplary embodiment of the present invention.

FIGS. 6-8 of the accompanying drawings illustrate steps for manufacturing a golf club head 600 and FIG. 9 is a flowchart detailing the method steps. It is noted that while the method steps are presented in a certain order, and unless otherwise specified, it is within the scope of the present invention for the steps to be carried out in a different order.

FIG. 6 shows a toe-side view of a golf club head 600 in accordance with an embodiment of the present invention. In a step S601 a first metallic portion 610 is provided. The first metallic portion 610 includes a striking face portion 618, a topline portion 602, a rear wall portion 609, a sole portion 606, a heel portion 608, and a hosel portion 620. The first metallic portion 610 may be formed as a single component or a plurality of components that are joined together by brazing, welding, adhesion, mechanical fastening, and the like. For example according to an exemplary embodiment of the present invention, the topline portion 602, the rear wall portion 609, the sole portion 606, the heel portion 608, and the hosel portion 620 may be formed through a casting and/or forging process. The striking face portion 618 portion may be formed through a separate casting and/or forging process and then joined to the remainder of the first metallic portion 610 by brazing, welding, adhesion, mechanical fastening, and the like. When the striking face portion 618 is formed separately from the remainder of the first metallic portion 610, the striking face portion 618 may include portions of one or more of the topline portion 602, the sole portion 606, and the toe portion (not shown).

Next in a step S602, a heel weight 614 is attached within a bottom portion of the heel portion 608 of the first metallic portion 610. The heel weight 614 may be attached within the bottom of the heel portion 608 by brazing, welding, adhesion, mechanical fastening, and the like. Preferably, the heel weight 614 is fastened to the first metallic portion 610 by welding or brazing.

Referring now to FIG. 7, in a step S603 an uncured composite element is inserted through the first opening 619 defined in the first metallic portion 610.

The uncured composite element may include a thermoset material or a thermoplastic material. The uncured composite element may include one or more plies of prepreg material. Further, the uncured composite element may include chopped and/or continuous fibers that are unidirectional or woven into a fabric.

Then in a step S604 the uncured composite element is cured for a predetermined time at a predetermined temperature in place to define a lightweight portion 612. Preferably a silicon bladder is inserted through the first opening 619 and is inflated during to the curing process. After the curing process, the bladder is removed and the cured composite element now defines the lightweight portion 612, which is bonded directly to the striking face portion 618, the topline portion 602, the rear wall portion 609, and the sole portion 606 with no gaps therebetween.

Referring now to FIG. 8, in a step S605, a toe weight 616 is attached within a bottom of the toe portion of the second metallic portion 613 by brazing, welding, adhesion, mechanical fastening, and the like. Preferably, the toe weight 616 is fastened to second metallic portion 813 by welding or brazing.

In a step S606, the first metallic portion 810 is joined to the second metallic portion 813 to define a hollow-bodied golf club head. The first metallic portion 810 may be joined to the second metallic portion 813 by brazing, welding, adhesive, or mechanical fastening. Preferably the first metallic portion 810 is joined to the second metallic portion 813 by welding or brazing.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the above specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. A hollow-bodied iron golf club head comprising:
a first metallic portion further comprising a hosel, a heel portion, a topline portion, a sole portion opposite said topline portion, a striking face portion, and a rear wall portion opposite said striking face portion,
wherein said sole portion, said striking face portion, said topline portion, and said rear wall portion collectively define a first opening near a toe side of said first metallic portion;
a lightweight portion further comprising an internal topline support, an internal sole support, an internal face support, and an internal rear wall support,
wherein said internal topline support, said internal sole support, said internal face support, and said internal rear wall support collectively form a hollow body and define a second opening near a toe side of said lightweight portion,
wherein said lightweight portion engages said first opening near said toe side of said first metallic portion, wherein said first metallic portion conceals said internal topline support, said internal sole support, said internal face support, and said internal rear wall support; and
a second metallic portion adapted to close said first opening and define a toe portion of said hollow-bodied iron golf club head,
wherein a toemost extent of said internal face support extends more toeward than a toemost extent of each of said internal sole support, said internal rear wall support, and said internal topline support,
wherein at a center of said striking face portion in a heel-to-toe direction, said lightweight portion extends continuously for 360 degrees from said internal face support, to said internal sole support, to said internal rear wall support, to said internal topline support,
wherein at said center of said striking face portion in said heel-to-toe direction, said first metallic portion extends continuously for 360 degrees from said striking face portion, to said sole portion, to said rear wall portion, to said topline portion.

2. The hollow-bodied iron golf club head of claim 1, wherein said internal topline support provides structural integrity for said topline portion, said internal sole support provides structural integrity for said sole portion, said internal face support provides structural integrity for said striking face portion, and said internal rear wall support provides structural integrity for said rear wall portion.

3. The hollow-bodied iron golf club head of claim 2, wherein said lightweight portion continuously contacts said first metallic portion from said striking face portion, to said topline portion, to said rear wall portion, to said sole portion along a majority of a width of the first metallic portion in said heel-to-toe direction.

4. The hollow-bodied iron golf club head of claim 1, wherein said lightweight portion is separated from said second metallic portion by a gap of about 2.0 to about 4.0 mm.

5. The hollow-bodied iron golf club head of claim 1, further comprising a heel weight and a toe weight, said heel weight being retained in said hollow-bodied iron golf club head by said first metallic portion and said toe weight being retained in said hollow-bodied iron golf club head by said second metallic portion,
wherein said heel weight and said toe weight are formed of a material having a density greater than a density of a material that forms said first metallic portion.

6. The hollow-bodied iron golf club head of claim 5, wherein said first metallic portion and said second metallic portion each comprise a steel material having a density greater than about 7.0 g/cc,
wherein said lightweight portion comprises a composite material having a density less than about 3.0 g/cc,
wherein both of said toe weight and said heel weight comprise a tungsten material having a density greater than about 15.0 g/cc.

7. The hollow-bodied iron golf club head of claim 1, wherein said striking face portion has a thickness of between about 0.75 mm and about 1.8 mm,
wherein said lightweight portion has a substantially constant thickness of between about 0.5 mm and about 2.0 mm,
wherein a perimeter portion of said rear wall portion has a thickness of between about 1.0 mm and about 2.0 mm, and
wherein a central portion of said rear wall portion has a thickness of between about 50% to about 90% of said thickness of said perimeter portion of said rear wall portion.

8. The hollow-bodied iron golf club head of claim 7, wherein said striking face portion has a thickness of between about 1.0 mm and about 1.6 mm,
wherein said lightweight portion has a substantially constant thickness of between about 0.75 mm and about 1.5 mm,
wherein said perimeter portion of said rear wall portion has a thickness of between about 1.25 mm and about 1.75 mm, and
wherein said central portion of said rear wall portion has a thickness of between about 60% to about 75% of said thickness of said perimeter portion of said rear wall portion.

9. The hollow-bodied iron golf club head of claim 8, wherein said striking face portion has a thickness of between about 1.3 mm and about 1.5 mm,
wherein said lightweight portion has a substantially constant thickness of between about 1.0 mm and about 1.2 mm,
wherein said perimeter portion of said rear wall portion has a thickness of about 1.5 mm, and
wherein said central portion of said rear wall portion has a thickness of about 66% of said thickness of said perimeter portion of said rear wall portion.

10. A hollow-bodied iron golf club head comprising:
a first metallic portion further comprising a hosel, a heel portion, a topline portion, a sole portion, a rear wall portion, and a striking face portion,
wherein said sole portion, said striking face portion, said topline portion, and said rear wall portion collectively define a first opening near a toe side of said first metallic portion;
a lightweight portion further comprising an internal topline support, an internal sole support, an internal face support, and an internal rear wall support, wherein said internal topline support, said internal sole support, said internal face support, and said internal rear wall support collectively define a second opening near a toe side of said lightweight portion, wherein said lightweight portion engages said first opening near said toe side of said first metallic portion;

wherein said first metallic portion conceals said internal topline support, said internal sole support, said internal face support, and said internal rear wall support;

a second metallic portion adapted to close said first opening and define a toe portion of said hollow-bodied iron golf club head;

a heel weight located at a bottom heel portion of said first metallic portion; and a toe weight located at a bottom toe portion of said second metallic portion, wherein a toemost extent of said internal face support extends more toeward than a toemost extent of each of said internal sole support, said internal rear wall support, and said internal topline support, wherein at a center of said striking face portion in a heel-to-toe direction, said lightweight portion extends continuously for 360 degrees from said internal face support, to said internal sole support, to said internal rear wall support, to said internal topline support, wherein at said center of said striking face portion in said heel-to-toe direction, said first metallic portion extends continuously for 360 degrees from said striking face portion, to said sole portion, to said rear wall portion, to said topline portion.

11. The hollow-bodied iron golf club head of claim 10, wherein said internal topline support provides structural integrity for said topline portion, said internal sole support provides structural integrity for said sole portion, said internal face support provides structural integrity for said striking face portion, and said internal rear wall support provides structural integrity for said rear wall portion.

12. The hollow-bodied iron golf club head of claim 10, wherein said lightweight portion continuously contacts said first metallic portion from said striking face portion, to said topline portion, to said rear wall portion, to said sole portion along a majority of a width of the first metallic portion in said heel-to-toe direction.

13. The hollow-bodied iron golf club head of claim 10, wherein said lightweight portion is separated from said second metallic portion by a gap of about 2.0 to about 4.0 mm.

14. The hollow-bodied iron golf club head of claim 10, wherein said striking face portion has a thickness of between about 0.75 mm and about 1.8 mm, wherein said lightweight portion has a substantially constant thickness of between about 0.5 mm and about 2.0 mm, wherein a perimeter portion of said rear wall portion has a thickness of between about 1.0 mm and about 2.0 mm, and wherein a central portion of said rear wall portion has a thickness of between about 50% to about 90% of said thickness of said perimeter portion of said rear wall portion.

15. The hollow-bodied iron golf club head of claim 14, wherein said striking face portion has a thickness of between about 1.0 mm and about 1.6 mm, wherein said lightweight portion has a substantially constant thickness of between about 0.75 mm and about 1.5 mm, wherein said perimeter portion of said rear wall portion has a thickness of between about 1.25 mm and about 1.75 mm, and wherein said central portion of said rear wall portion has a thickness of between about 60% to about 75% of said thickness of said perimeter portion of said rear wall portion.

16. The hollow-bodied iron golf club head of claim 15, wherein said striking face portion has a thickness of between about 1.3 mm and about 1.5 mm, wherein said lightweight portion has a substantially constant thickness of between about 1.0 mm and about 1.2 mm, wherein said perimeter portion of said rear wall portion has a thickness of about 1.5 mm, and wherein said central portion of said rear wall portion has a thickness of about 66% of said thickness of said perimeter portion of said rear wall portion.

17. The hollow-bodied iron golf club head of claim 10, wherein said first metallic portion and said second metallic portion each comprise a steel material having a density greater than about 7.0 g/cc, wherein said lightweight portion comprises a composite material having a density less than about 3.0 g/cc, wherein both of said toe weight and said heel weight are made out of a tungsten material having a density greater than about 15.0 g/cc.

18. A method of manufacturing a hollow-bodied iron golf club head, comprising:

providing a first metallic portion further comprising a hosel, a heel portion, a topline portion, a sole portion, a rear wall portion, and a striking face portion, wherein said sole portion, said striking face portion, said topline portion, and said rear wall portion collectively define a first opening near a toe side of said first metallic portion;

securing a heel weight within said heel portion of said first metallic portion;

providing an uncured composite element through said first opening;

curing said uncured composite element for a predetermined time and a predetermined temperature so as to define a lightweight portion further comprising an internal topline support, an internal sole support, an internal face support, and an internal rear wall support, wherein said internal topline support, said internal sole support, said internal face support, and said internal rear wall support collectively form a hollow body and define a second opening near a toe side of said lightweight portion, wherein said first metallic portion conceals said internal topline support, said internal sole support, said internal face support, and said internal rear wall support, providing a second metallic portion that defines a toe portion of said hollow-bodied iron golf club head;

securing a toe weight within said toe portion of said second metallic portion; and joining said second metallic portion to said first metallic portion, wherein a toemost extent of said internal face support extends more toeward than a toemost extent of each of said internal sole support, said internal rear wall support, and said internal topline support, wherein at a center of said striking face portion in a heel-to-toe direction, said lightweight portion extends continuously for 360 degrees from said internal face support, to said internal sole support, to said internal rear wall support, to said internal topline support, wherein at said center of said striking face portion in said heel-to-toe direction, said first metallic portion extends continuously for 360 degrees from said striking face portion, to said sole portion, to said rear wall portion, to said topline portion.

19. The method of claim 18, wherein said curing said uncured composite element further comprises:

inserting a silicone bladder within said first metallic portion through said first opening and said second opening such that said uncured composite element is interposed between said bladder and said first metallic portion;

inflating said silicon bladder such that said uncured composite element contacts said striking face portion, said topline portion, said rear wall portion, and said sole portion;

curing said uncured composite element for said predetermined time and said predetermined temperature so as to define said lightweight portion further comprising said internal topline support, said internal sole support, said internal face support, and said internal rear wall support; and removing said silicon bladder from said first metallic portion.

20. The method of claim 18, wherein said lightweight portion continuously contacts said first metallic portion from said striking face portion, to said topline portion, to said rear wall portion, to said sole portion along a majority of a width of the first metallic portion in said heel-to-toe direction.

\* \* \* \* \*